United States Patent [19]

Machacek

[11] 4,008,110
[45] Feb. 15, 1977

[54] WATER GEL EXPLOSIVES

[75] Inventor: Oldrich Machacek, Allentown, Pa.

[73] Assignee: Atlas Powder Company, Dallas, Tex.

[22] Filed: July 7, 1975

[21] Appl. No.: 593,307

[52] U.S. Cl. .................................. 149/46; 149/38; 149/62; 149/78; 149/89; 149/108.8

[51] Int. Cl.² .................. C06B 31/28; C06B 33/08; C06B 31/12; C06B 25/36

[58] Field of Search ............ 149/62, 78, 89, 91, 149/108.8, 37, 38, 42, 43, 44, 46, 47

[56] References Cited

UNITED STATES PATENTS

| | | | |
|---|---|---|---|
| 3,282,753 | 11/1966 | Cook | 149/46 |
| 3,356,544 | 12/1967 | Fee | 149/89 |
| 3,390,029 | 6/1968 | Preckel | 149/44 |
| 3,409,485 | 11/1968 | Minnick | 149/21 |
| 3,419,444 | 12/1968 | Minnick | 149/2 |
| 3,653,996 | 4/1972 | Edwards | 149/89 |
| 3,695,947 | 10/1972 | Edwards | 149/89 |
| 3,765,966 | 10/1973 | Edwards | 149/89 |
| 3,765,967 | 10/1973 | Funk | 149/21 |

*Primary Examiner*—Samuel W. Engle
*Assistant Examiner*—Donald P. Walsh

[57] ABSTRACT

A method for producing water gel explosives by stabilizing a dispersion of nitroparaffin, preferably nitromethane, in an aqueous oxidizer salt solution through the simultaneous in situ gelation of the nitromethane dispersed phase and the continuous external aqueous phase, and the product so produced.

39 Claims, No Drawings

WATER GEL EXPLOSIVES

BACKGROUND OF THE INVENTION

Nitroparaffins having 1-3 carbon atoms and mixtures thereof, and particularly nitromethane, are known to be sensitizers for water gel explosives. Some serious problems are encountered in producing stable water gel explosives using nitroparaffin sensitizers and those sensitized gels which are known are of generally low sensitivity and are usually detonated with the aid of boosters. Nitromethane is soluble to a degree, say up to 10%, in an aqueous phase. Higher concentrations of nitromethane can be used more effectively to sensitize a water gel explosive composition. To achieve the higher concentrations or a more sensitive condition, the insoluble portion of the nitromethane must be suspended or dispersed by mixing it as very fine droplets in the overall aqueous gel structure of the explosive composition. It is usually accepted that the finer droplets, the higher will be the sensitivity factor. In the case of the more fluid pourable and pumpable gels, the fine droplets of nitromethane have a tendency to coalesce into larger less effective droplets and to migrate until the insoluble nitromethane has effectively separated from the aqueous gel structure to form a separate layer. When this occurs, the overall composition becomes less sensitive and in most cases undetonable. This type of product is most unacceptable especially when the nitromethane sensitized explosive gel is poured or pumped through water which may cause the nitromethane to be separated from the aqueous gel structure more rapidly. Water attack on the aqueous gel structure accelerates this separation. Even stiff nonpourable or nonpumpable nitromethane sensitized gels show a tendency for the nitromethane to separate during storage.

In prior attempts to stabilize the nitromethane so that it resists coalescence and separation, various approaches have been taken. For instance, emulsifiers have been used for stabilizing the nitromethane, but the presence thereof appears to reduce the overall water resistance of such a composition. In storage, the separation shelf life of the emulsion-gel is directly related to the quality of the aqueous gel produced by the guar gelling agent, to the quality of the nitromethane emulsion as it is effected by the quality of the emulsifying agent, the size of the nitromethane dispersion and the mixing procedure.

Others have suggested the use of nitrocellulose as a gelling agent for the nitromethane but have failed to produce cap sensitive or higher sensitive compositions which indicates that high nitromethane concentrations or adequate dispersions were not even contemplated. In addition, a slower two-step process is taught for producing the composition wherein the nitroparaffin is first gelled after which it is combined by mixing with an aqueous oxidizer phase (Minnick, U.S. Pat. No. 3,419,444). This necessarily means that the nitromethane gel will be dispersed in a variety of particle sizes throughout the aqueous phase rather than in the more desirable smaller droplets.

Other attempts to inhibit nitromethane separation from aqueous gels include forming a nitromethane compound such as the Tris (hydroxymethyl) nitromethane which is soluble in the aqueous phase of the composition or by adding an alcohol to aid in making the nitroparaffin more soluble in aqueous gels (Minnick U.S. Pat. No. 3,419,444 and U.S. Pat. No. 3,409,485). However, once again booster systems are required to detonate these compositions and higher nitromethane concentrations are not contemplated.

THE INVENTION

Keeping in mind that the effectiveness and separation stability of the insoluble portion of the nitroparaffin as a sensitizer for the water gel explosive depends upon good dispersion of the nitroparaffin particles throughout the aqueous phase of the composition and that good dispersion is only achieved through the use of small, very fine particles, the present invention is directed to achieving these ends and the product so produced. The invention involves a new and novel method of stabilizing dispersions of small to larger amounts of insoluble nitroparaffin in aqueous gel explosive systems to produce both low and high sensitive explosives. This is achieved by the essentially simultaneous in situ gelation of an internal nitroparaffin dispersed phase and a continuous external aqueous phase. This results in a gel wherein the nitroparaffin particle size ranges from 0.5-500 microns with the preferred range being 2-200 microns. Both cap and noncap sensitive products can be achieved with such ranges. For instance, sensitivity to a No. 6 cap can be achieved within these ranges. Since the nitroparaffin is dispersed as very fine particles in a continuous aqueous oxidizer salt gel and each particle is made firm by gelation, the nitroparaffin shows little tendency to coalesce or migrate within the aqueous gel structure.

The formation of the double gel of this invention is achieved in its broadest sense by mixing the liquid nitroparaffin, preferably nitromethane, in an aqueous oxidizer salt solution in the presence of a gelling agent for the aqueous phase and a gelling agent for the nitroparaffin phase. The entire mixture is then mixed whereby the nitroparaffin and salt phases are simultaneously gelled in situ. Once the desired predetermined viscosity is reached, the mixing is terminated and the gel is packaged.

Examples of inorganic oxidizing salts which can be used with the present invention are ammonium, alkali metal and alkaline earth metal nitrates, perchlorates and chlorates. Specific preferred examples of commonly employed salts are ammonium nitrate, ammonium perchlorate, sodium nitrate, sodium perchlorate, potassium nitrate, potassium perchlorate, magnesium nitrate, magnesium perchlorate, calcium nitrate, other like salts and mixtures thereof.

Supplementary sensitizers which may also be used could include organic amine nitrates such as methyl amine nitrate, ethylene diamine nitrate and hydrazine nitrate.

To adjust the oxygen balance of the gels, liquid or solid fuels commonly used in the explosive art may be added with water soluble liquid fuels preferred although such fuels are not necessary. Particulate aluminum may be added as a fuel for greater power output or sensitivity.

The sensitivity is enhanced by occluding air voids during mixing or by adding a chemical gas release agent or by adding bubbles during the mixing, for instance, hollow glass or resin spheres, wood pulp or perlite. A crosslinking agent for the aqueous phase is added to the mixture. Suitable agents are polyvalent metal salts including borates, chromates, dichromates, antimonates and oxalates and tartarates. Potassium dichromate and "potassium pyroantimonate" are good crosslinkers.

No cross-linking agent is used or required for the nitroparaffin phase.

One of the gelling agents used is insoluble in water but soluble in and capable of gelling nitromethane. The other gelling agent is soluble in water and capable of gelling aqueous solutions. After the nitromethane is dispersed as fine droplets in the oxidizer solution, gelling agents and crosslinking agents can be added in one operation or added separately. The order of addition can be used to control the viscosity of the mix during the process cycle.

The preferred agent used to gel the nitromethane is a cyanoethylether derivative of (guar) gallactomannan gum supplied by General Mills Co. under the name GEN GEL-512. Modifications of the GEN GEL-512 type compound can also be used as the nitromethane gelling agent. Other gelling agents for the nitromethane are nitrated guar and nitrocellulose.

For gelling the oxidizer salt solution the more conventional water soluble gums and gel modifiers such as guar and preferably chemically modified guars for example, HP 8 as sold by Stein-Hall Co. can be used satisfactorily. Other examples of gelling agents and gel modifiers for the aqueous phase are carboxymethyl cellulose, methyl cellulose, water soluble starches, pregellatinized starch, cereal flour, plant gums, karaya, synthetic polymers including polyacrylamides and polyvinyl alcohols and the like.

On a percent by weight basis, the nitroparaffin phase may be between 1–50% of the total composition weight. The gelling agent for the nitroparaffin phase may vary between 0.1–5.0% of the nitroparaffin phase. The actual water present may vary between 5–30% of the total composition weight while the gelling agent for the aqueous phase may vary between 1.0–15.0% of the water present. The amount of crosslinking agent for the aqueous phase may vary between 0.1–12.0% of the crosslinkable gum present.

The preferred ranges using the above system of determining percentage amounts are 3–30% nitroparaffin, 0.2–2.0% nitroparaffin gelling agent, 2–10% water gelling agent, 0.5–5.0% water gel crosslinking agent and 7–25% water.

DETAILS OF THE INVENTION

The following examples wherein the concentrations are expressed in parts by weight of the total composition will serve to illustrate the invention.

1. Pourable or Pumpable Gel
Formula:
   55.8 p. Ammonium nitrate (AN)
   22.0 p. Water
   0.006 p. Potassium pyroantimonate (PPA)
   0.1 p. Gen Gel-512
   20.0 p. Nitromethane (NM)
   0.6 p. Guar gum
   1.5 p. Glass bulking agent The water and AN are added to a mixer and heated to 120° F. to obtain a clear solution. The solution is mixed and the PPA, Gen Gel-512, and glass bulking agent are agitated into suspension. A small portion of the NM is used to make a paste with the guar gum in a separate container. The bulk of the NM is added to the mixer and beaten into fine suspension. The guar-NM paste is then added. Mixing is continued until a limited viscosity is achieved and the product is then packaged. The gel prepared by this method had the following properties:
   Density 1.25 g/cc
   Pourable and pumpable
   Excellent water resistance
   Detonable in 2 inch diameter with 2g PETN
   Not sensitive to a No. 8 cap (NCN)
   Velocity 17,500 to 18,500 ft./sec.

2. Packagable Firm Gel
Formula:
   20.00 p. AN flake
   42.00 p. AN ground
   12.20 p. Water
   18.00 p. NM
   2.00 p. Glass bulking agent
   0.65 p. Guar gum
   0.15 p. Gen Gel-512
   5.00 p. Coarse aluminum
   0.016 p. PPA The water and AN flakes are added to a mixer and heated to 140° F. to obtain a clear solution. The NM and glass bulking agent are then added and agitated into suspension. A separate container is used to preare a dry blend of the guar gum, Gen Gel-512, and a small portion of the ground AN. The bulk of the ground AN is added to the mixer and the dry blend is added immediately thereafter. The mixture is agitated to a predetermined viscosity and the aluminum and PPA are then added. When the aluminum is dispersed, the product at about 80° F. is packaged. Additional crosslinking of the aqueous gel occurs in the package to produce a firm bodied product. The gel prepared by this method had the following properties:
   Density 1.29 g/cc
   Firm consistency
   Detonable in 2 inch diameter with 2g PETN
   Velocity 15,150 FPS 3. Cap Sensitive Gel
Formula:
   20.0 p. AN flake
   21.6 p. AN ground
   16.0 p. Sodium perchlorate (SP)
   13.6 p. Water
   20.0 p. NM
   3.0 p. Glass bulking agent
   0.6 p. Guar
   0.2 p. Gen Gel-512
   0.02 p. PPA
   5.00 p. Coarse aluminum The water, AN flakes and SP are added to a mixer and heated to 95° C. The NM and bulking agent are agitated into suspension. Most of the ground AN is added. A small portion of the AN is used to prepare a dry blend of the guar and Gen Gel-512; this blend is added immediately followed by the addition of the aluminum. At a predetermined viscosity, the PPA is added. The gel is packaged at about 80° F. Additional crosslinking occurs in the package to produce a firm rubbery gel whose properties are as follows:
   Density 1.26 g/cc
   Detonable in 1¼ inch diameter with a No. 6 cap
   Detonable at 20° F. with a No. 6 cap
   Detonable at 12° F. with a No. 8 cap
   Detonable under a 270 ft. static head
   Velocity 14,500 ft./sec.

The advantages of the invention are numerous. It is now possible, where heretofore it was not possible, to incorporate large quantities of nitroparaffin in aqueous oxidizer gel structure as a stable two-phase dispersion. The gelation of the nitroparaffin eliminates the need for an emulsifying agent or a solubilizing agent to prevent liquid separation of the nitroparaffin. Larger quantities of nitroparaffin can be used in aqueous gels without the need for additional fuels (such as solubilizers). This results in greater sensitivity control and permits detonation at lower temperatures, in smaller diameters, using number 6 caps for initiation. Sensitivity is enhanced by the fine particle size of the nitroparaffin droplets in which case a larger interface surface area of nitroparaffin-oxidizer solutions (gel) can be achieved. Sensitivity can be controlled so that products of cap and noncap sensitivity can be prepared. Since additional fuels are not required, there is a greater freedom in adjusting the oxygen balance of formulas and greater flexibility in designing products for a specific Fume Class. The water resistance of the present gels is also enhanced since water soluble fuels and emulsifiers are not required.

As will be evident to those skilled in the art, various modifications can be made or followed in light of the foregoing disclosure and discussion, without departing from the spirit or scope of the claims.

What is claimed is:

1. A method for producing a surfactant free water gel explosive composition having lasting stability comprising the steps of combining a liquid nitroparaffin having 1–3 carbon atoms in an amount of 3–30% by weight of the total composition for use as an internal dispersed phase and free of crosslinking agents, an aqueous oxidizer salt solution for use as a continuous external phase, a gelling agent soluble in water for the aqueous oxidizer solution phase, a crosslinking agent for the aqueous oxidizer solution phase, and 0.2–2.0% by weight of the nitroparaffin present of a gelling agent insoluble in water for the liquid nitroparaffin phase, incorporating voids in the above combined components, mixing the combined components to disperse the nitroparaffin phase as fine particles within the continuous aqueous oxidizer salt solution phase, and simultaneously gelling in situ the dispersed nitroparaffin phase and the aqueous salt solution phase by continuing the mixing until a predetermined viscosity of the gel is achieved.

2. The method of claim 1 wherein the liquid nitroparaffin is nitromethane.

3. The method of claim 1 wherein the gelling agent for the nitroparaffin is a member selected from the group consisting of a cyanoethylether derivative of (guar) gallactomannan gum, a nitrated guar and nitrocellulose.

4. The method of claim 3 wherein the nitroparaffin is nitromethane and the gelling agent is a cyanoethylether derivative of (guar) gallactomannan gum.

5. The method of claim 1 wherein the voids in the mixture are formed by incorporating air bubbles in the mixture.

6. The method of claim 1 wherein the voids are added by incorporating air-entrapping sensitizing material in the mixture.

7. The method of claim 1 wherein the dispersed nitroparaffin particles range in size from 0.5–500 microns.

8. The method of claim 7 wherein the dispersed nitroparaffin particles range in size from 2–200 microns.

9. The method of claim 1 wherein additional fuels are added to the mixture.

10. The method of claim 9 wherein particulate aluminum is added as a fuel to the mixture.

11. The method of claim 1 wherein the aqueous oxidizing salt solution consists of water and a salt selected from the group consisting of ammonium, alkali metal and alkaline earth metal nitrates, perchlorates and chlorates.

12. The method of claim 11 wherein the aqueous oxidizing salt solution consists of a member selected from the group consisting of ammonium nitrate, ammonium perchlorate, sodium nitrate, sodium perchlorate, potassium nitrate, potassium perchlorate, magnesium nitrate, magnesium perchlorate and calcium nitrate.

13. The method of claim 1 wherein the crosslinking agent is a polyvalent metal salt.

14. The method of claim 1 wherein the crosslinking agent is selected from the group consisting of metal salts of borates, chromates, dichromates, antimonates, tartarates, and oxalates.

15. The method of claim 1 wherein the crosslinking agent is a member selected from the group consisting of ammonium chromate and ammonium dichromate.

16. The method of claim 1 wherein the gelling agent for the aqueous salt solution is a member selected from the group consisting of carboxymethyl, cellulose, methyl cellulose, water soluble starches, pregellatinized starch, cereal flour, plant gums, karaya, synthetic polymers, polyacrylamides and polyvinyl alcohols.

17. The method of claim 16 wherein the gelling agent is guar gum.

18. The method of claim 16 wherein the gelling agent is a modified guar gum.

19. The method of claim 6 wherein the air-entrapping sensitizing material is a member selected from the group consisting of hollow glass spheres, resin balloons, wood pulp and perlite.

20. The method according to claim 1 wherein the amount of aqueous solution gelling agent present is 2–10%, the amount of crosslinking agent for the aqueous phase present is 0.5–5.0% and the amount of water present is 7–25%.

21. A surfactant free water gel explosive composition having lasting stability comprising an internal phase of a liquid nitroparaffin having 1–3 carbon atoms in an amount of 3–30% by weight of the total composition and free of crosslinking agents, an external continuous phase of an aqueous oxidizer salt solution, said nitroparaffin phase being dispersed as fine droplets within said external phase, a gelling agent soluble in water for the aqueous solution phase, a crosslinking agent for the aqueous solution phase, air voids in said composition, and a gelling agent insoluble in water for the nitroparaffin phase in an amount of 0.2–2.0% by weight of the nitroparaffin present.

22. A water gel composition of claim 21 wherein the amount of aqueous solution gelling agent present is 2–10%, the amount of crosslinking agent present is 0.5–5.0% and the amount of water present is 7–25%.

23. The water gel explosive composition of claim 21 wherein the fine droplets of dispersed liquid nitroparaffin are of 0.5–500 microns in size.

24. The composition of claim 21 wherein the droplets of nitroparaffin range in size from 2–200 microns.

25. The composition of claim 21 wherein the nitroparaffin is nitromethane.

26. The composition of claim 21 wherein the gelling agent for the nitroparaffin is a member selected from the group consisting of a cyanoethylether derivative of (guar) gallactomannan gum, nitrated guar and nitrocellulose.

27. The composition of claim 21 wherein the nitroparaffin is nitromethane and the gelling agent therefor is a cyanoethylether derivative of (guar) gallactomannan gum.

28. The composition of claim 21 containing an additional fuel.

29. The composition of claim 27 wherein the fuel is particulate aluminum.

30. The composition of claim 21 wherein the air voids consist of an air entrapping material selected from the group consisting of air bubbles, hollow glass spheres, resin balloons, wood pulp and perlite.

31. The composition of claim 21 wherein the aqueous oxidizing salt solution consists of water and a salt selected from the group consisting of ammonium, alkali metal and alkaline earth metal nitrates, perchlorates and chlorates.

32. The composition of claim 21 wherein the cross-linking agent is polyvalent metal salt.

33. The composition of claim 21 wherein the cross-linking agent is selected from the group consisting of metal salts of borates, chromates, dichromates, antimonates, tartarates and oxalates.

34. The composition of claim 21 wherein the cross-linking agent is a member selected from the group consisting of ammonium chromate and ammonium dichromate.

35. The composition of claim 21 wherein the gelling agent for the aqueous salt solution is a member selected from the group consisting of carboxymethyl cellulose, methyl cellulose, water soluble starches, pregellatinized starch, cereal flour, plant gum, karaya, synthetic polymers, polyacrylamides and polyvinyl alcohols.

36. The method of claim 6 wherein the gelling agent is guar gum.

37. The method of claim 7 wherein the gelling agent is a modified guar gum.

38. A method for producing a water gel explosive composition having lasting stability consisting essentially of the steps of combining a liquid nitroparaffin having 1-3 carbon atoms in an amount of 3-30% by weight of the total composition for use as an internal dispersed phase, an aqueous oxidizer salt solution for use as a continuous external phase, a gelling agent soluble in water for the aqueous oxidizer solution phase, a cross-linking agent for the aqueous oxidizer solution phase, and a gelling agent insoluble in water for the liquid nitroparaffin phase in an amount of 0.2–2.0% by weight of the nitroparaffin present, incorporating voids in the above combined components, mixing the combined components to disperse the nitroparaffin phase as fine particles within the continuous aqueous oxidizer salt solution phase, and simultaneously gelling in situ the dispersed nitroparaffin phase and the aqueous salt solution phase by continuing the mixing until a predetermined viscosity of the gel is achieved.

39. A water gel explosive composition having lasting stability consisting essentially of an internal phase of a liquid nitroparaffin having 1-3 carbon atoms in an amount of 3-30% by weight of the total composition, an external continuous phase of an aqueous oxidizer salt solution, said internal nitroparaffin phase being dispersed as fine droplets within said external phase, a gelling agent soluble in water for the aqueous solution phase, a gelling agent insoluble in water for the nitroparaffin phase in an amount of 0.2–2.0% by weight of the nitroparaffin present, a crosslinking agent for the aqueous solution phase, and air voids in said composition.

* * * * *